March 3, 1970  J. H. SNYDER  3,498,326
FLUID DISTRIBUTION DEVICE
Filed May 1, 1968  2 Sheets-Sheet 1
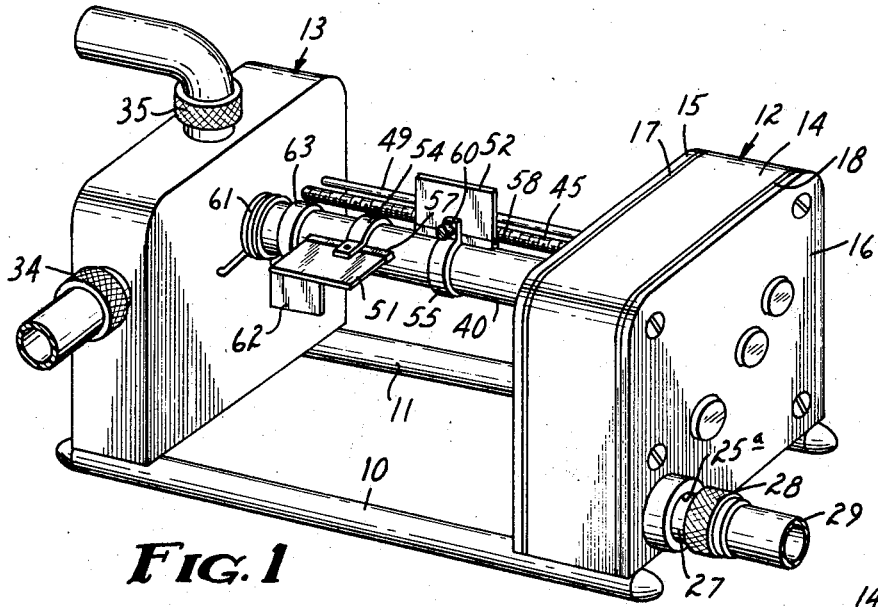
FIG. 1
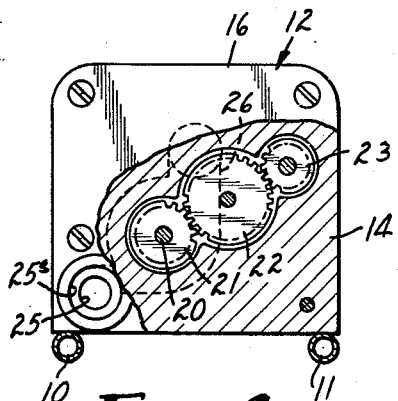
FIG. 3
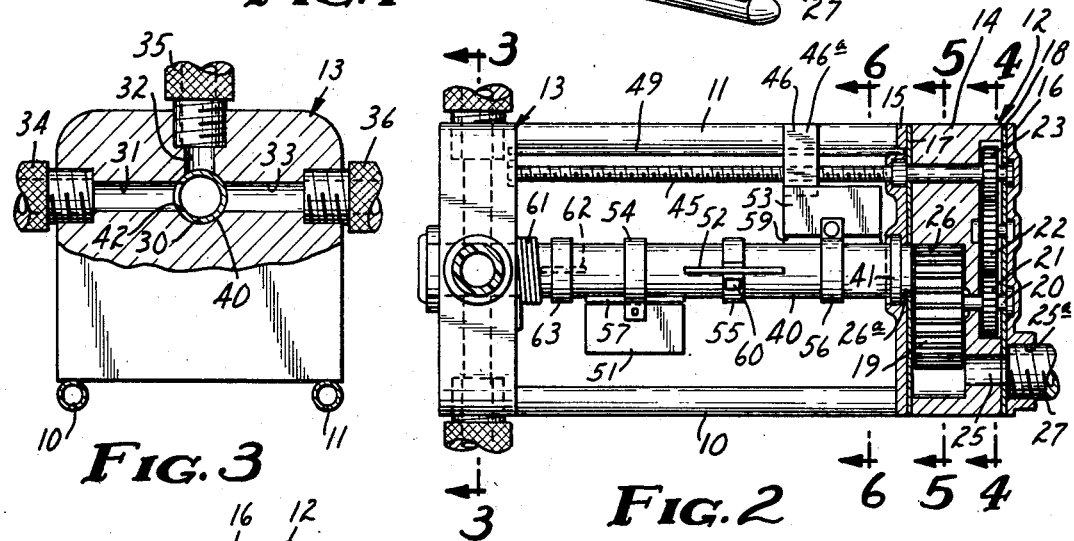
FIG. 2
FIG. 4
INVENTOR.
JAMES H. SNYDER
BY
Merchant & Gould
ATTORNEYS March 3, 1970

J. H. SNYDER 3,498,326

FLUID DISTRIBUTION DEVICE

Filed May 1, 1968

INVENTOR.
JAMES H. SNYDER
BY
Merchant & Gould
ATTORNEYS

United States Patent Office 3,498,326
Patented Mar. 3, 1970

3,498,326
FLUID DISTRIBUTION DEVICE
James H. Snyder, Battle Creek, Mich., assignor of twenty-two percent each to Fred Hallway, Plymouth, Mich., and Harmon W. Ruliffson and Daniel F. Eckoldt, Minneapolis, Minn., and eleven and one-third percent each to John B. Becker, Excelsior, and Robert C. Becker, Minneapolis, Minn.
Filed May 1, 1968, Ser. No. 725,758
Int. Cl. F16k *31/36, 51/00;* A01g *25/00*
U.S. Cl. 137—625.11                              13 Claims

ABSTRACT OF THE DISCLOSURE

This application discloses a water distribution device for multiple head lawn sprinkler systems. A hollow, rotatable rotor is journaled in a frame and biased to rotate through a plurality of different positions in each of which an opening in the rotor is aligned with one of several distributing pipes for the system. A fluid operated motor is provided to drive a lead screw on which is mounted a threaded stop member that travels along said lead screw upon rotation thereof. A plurality of cam members mounted on the rotor successively engage the stop member as it travels along the lead screw to hold the rotor in the different positions. Water flows through the fluid motor and through the rotor into the distributing pipes, one at a time.

BACKGROUND OF THE INVENTION

Field of the invention

This invention relates generally to lawn sprinkler systems and more particularly relates to a device for accurately distributing water among a plurality of distributing pipes for a multiple head system, so that a predetermined volume of water flows to each part of the system.

Description of the prior art

Automatic lawn sprinkler systems have long been available but their popularity among the general public has recently increased. In such systems, the lawn is divided into sections and each section is provided with a separate distributing pipe and sprinkler head. Since the water pressure and flow that is available is not normally sufficient to operate all of the sprinkler heads simultaneously, it is common practice to utilize a control system to switch the flow sequentially through the sprinkler heads. Thus, only one sprinkler head is operated at one time and the full water pressure and flow is available for that head.

Many control systems have heretofore been devised for distributing water flow through a plurality of sprinkler heads in a sequential manner. The prior art control systems of which we are aware all have certain drawbacks, especially if it is desired to manufacture and sell a simple, reliable system for use by members of the general public. If the average home owner is to be able to purchase and use a control system of this type, it must have certain characteristics. The unit must be simple in construction and must not be susceptible to leakage of water at high inlet pressures. The unit must not be susceptible to jamming caused by contaminates in the water. Preferably, there should be relatively few parts in the mechanism so that the design is inherently more reliable in operation and lower in production unit cost. The device should not require electrical connections that would cause a shock hazard to exist. It should be possible for the operator to easily control the amount of water distributed through each sprinkler head. Further, since the available water pressure typically varies through a wide range, the control system should distribute a predetermined amount of water to each part of the system, regardless of fluctuations in water pressure between cycles, or within one particular cycle. Also, in order to make the available water pressure fully usable, the control system should snap quickly from one outlet to the other so that the available pressure is not divided between two sections of the system. This list of requirements is not meant to be all inclusive, but it does represent the basic functions that any good sprinkler system should be able to provide.

The prior art systems of which I am aware have fallen short of meeting all of these requirements. For example, U.S. Patent Nos. 1,004,726 and 1,739,787 both disclose systems in which a single inlet distributes water to a plurality of outlets by the rotation of a rotor inside a stator. The rotor is provided with a plurality of slots located at different angular positions while the stator is provided with a like plurality of aligned slots. As the rotor turns, the rotor slots are sequentially aligned with the stator openings. Since the alignment of the slots is gradual, the flow of water through one gradually reduces while the flow of water through the next one gradually increases. Thus, the flow is non-uniform during the change over from port to port. Also, when the pressure is temporarily divided between two outlet ports, the pressure at the two sprinklers is diminished. This gradual change over is undesirable since it makes it difficult to control the amount of water flowing to each part of the system. Further, if the available water pressure is quite low, neither of the sprinkler heads will operate properly during the change over situation.

The control system disclosed in Patent No. 1,004,726 is also undesirable since the rotor speed is determined by a float resting on the surface of the water in a container which is slowly draining empty. This time controlled approach to controlling distribution is undesirable since a change in available water pressure would change the amount of water flowing through each port. In order for each port to discharge the same amount of water, constant water pressure is necessary. Typically, a constant water pressure is not available. In general, any system that depends upon time alone to measure the duration of flow through each port is undesirable since the volume of water flowing through the system during any selected time period may vary depending upon the water pressure.

Another disadvantage of these two prior art systems is that they are not adjustable with respect to the amount of water delivered by each port. The sizes of the ports in the rotor and stator are fixed so that the amount of water flowing through any one port cannot be easily changed. This is undesirable since one section of a lawn may require more water than another. It should be possible for an operator to vary the amount of water going to each section of the lawn, based upon his experience in using the system.

Patent No. 1,753,240 discloses a system in which fluid flow powers several output valves in sequence. This prior art system is highly susceptible to plugging or fouling from water contamination since the water flows from the water motor through a housing in which all of the valving mechanisms are contained. This system is quite complicated, requiring approximately twenty-eight piece parts just to provide the valving function for four valves. The water motor and the overhead gear train mechanism and the central drive annulus complex adds approximately another fifteen piece parts. Aside from the complexity and the obvious high cost of manufacturing a system such as this, it is not an easy one for an operator to regulate. For example, if the operator wishes to change the volume of water to be delivered at any one period of an open valve, he must remove the lid and shift the pinion from one to another of the annular drive gears. Changing the amount of water at any one port automatically changes water outlet at subsequent ports.

The deficiencies I have outlined above with respect to the prior art systems identified above, are typical of those that are found in the other prior art systems that I have investigated. Any system that gradually closes off one valve while gradually opening the next is simply not a desirable once since during the change over period, little or no actual lawn sprinkling may occur. Any system in which all of the water flows by most of the operating parts is an undesirable one since constant water flow will eventually cause contamination. Any system that requires a large number of piece parts is also undesirable since the cost of manufacturing and assembling such a unit would be excessive. Other prior art patents of which I am aware, and which are subject to the same deficiencies, are 3,241,767; 3,108,609; 2,642,076; 1,134,621; 2,674,490; and 2,445,717.

SUMMARY OF THE INVENTION

The present invention employs fluid pressure to run a water motor. Water motor movement is therefore a function of the available water pressure. In effect, the water motor integrates the total water potential available over a period of time, and uses this information to control a lead screw/cam follower mechanism to cause the output to index sequentially through the outlet ports as a function of the mass flow of the water. In this manner, an area with low water pressure would receive the same total amount of water, because of a longer cycle time per outlet port, as an area with higher water pressure. The same holds true even if the variation in water pressure occurs during a single cycle. In summary, the present invention allows water at low pressure to flow from an outlet port for a longer period of time, and at higher pressure for a relatively shorter period of time, thus providing uniform total water distribution per outlet port, regardless of inlet water pressure.

If the operator desires to depart from this "equal water per outlet" capability, a special adjustment can be made which will allow different water flow for each outlet. This adjustment involves lengthening or shortening of the cams that engage the cam follower mechanism.

Water flow through the present device is simple and direct. Water passes through the water motor and then enters the pipe rotor. From the rotor, water discharges to the distributing pipe outlets. The cam and cam follower mechanisms are not immersed in water, and thus are not susceptible to contamination and corrosion.

The rotor is spring loaded in a cocked position so that when the lead screw driven cam follower passes a cam mounted on the rotor, a snap-action rotation of the rotor occurs which immediately shuts off water flow to one outlet and provides water flow to the succeeding outlet. This snap-action approach to rotation of the rotor is much to be preferred over the type of mechanism which gradually shuts off one outlet while equally gradually opening the succeeding outlet.

Because the present distributor operates on water pressure alone, no provision need be made for electrical power to or from the unit, therefore no electrical hazard exists. The unit is self contained and does not require external mechanisms such as clocks, relays, motors or cams, as in the case of some prior art devices.

BRIEF DESCRIPTION OF THE DRAWINGS

FIGURE 1 is a view in perspective of my fluid distributing device;

FIGURE 2 is a top plan of my invention, portions thereof being broken away and shown in section;

FIGURE 3 is a view, partly in section, taken along line 3—3 of FIGURE 2;

FIGURE 4 is a view, partly in section, taken along line 4—4 of FIGURE 2;

DESCRIPTION OF THE PREFERRED EMBODIMENT

Figure 5:
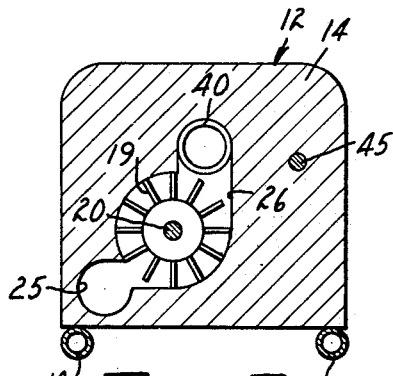
FIGURE 5 is a sectional view taken along line 5—5 of FIGURE 2.

Referring now to the drawings, wherein like numbers are used throughout the several views to indicate like elements of the invention, there is disclosed in FIG. 1 a perspective view of my fluid distributing device. The device is mounted on a frame comprising a pair of parallel tubular runners 10 and 11. Mounted on the frame, at opposite ends thereof, are a pair of spaced housings 12 and 13. First housing 12 includes a body portion 14 and a pair of end plates 15 and 16 connected to opposite ends thereof. Suitable gaskets 17 and 18 are mounted between the end plates and the body portion 14 to prevent leakage of water therefrom.

A water motor 19 is mounted in a suitable cavity in body portion 14. Motor 19 is mounted for rotation with a shaft 20, which extends into another cavity in body portion 14. Secured to shaft 20 in the other cavity is an output gear 21, which, through an intermediate gear 22 drives a third gear 23. As best shown in FIGS. 2 and 4, gears 21, 22 and 23 are all mounted in suitable cavities in body portion 14.

Body portion 14 is also provided with a suitable water inlet port 25, which supplies water to the water motor 19. Water passing through water motor 19 leaves body portion 14 through a suitable outlet opening or port 26. Inlet opening 25 is aligned with a similar opening 25a in end plate 16. An inlet pipe 27 is threadedly secured within opening 25a. As best shown in FIG. 1, inlet pipe 27 can be provided with a suitable coupling 28 for attachment of a hose 29 thereto.

An outlet opening 26a in end plate 15 is also aligned with outlet opening 26 in body portion 14. Thus, if water under pressure is introduced into inlet opening 25 through inlet pipe 27, the water will cause the rotation of water motor 19 during its passage therethrough and will leave the housing 12 through outlet openings 26 and 26a. Water motor 19 is designed such that it is operative to be driven at a rate determined by the volume of water flowing therethrough. The particular type of water motor used is not critical to my invention, however, so long as its speed of rotation does reflect the volume of water flowing through it.

Second housing 13 is constructed from a single block of material such as metal or plastic. Housing 13 is provided with an aperture 30 which extends between the end faces thereof and is in line with the outlet opening 26a of end plate 15. Aperture 30 is a circular opening having the same diameter throughout its length. Also formed within housing 13, at right angles to aperture 30, are a plurality of outlet ports 31, 32 and 33. Outlet ports 31, 32 and all open into the side wall of aperture 30, at spaced positions around the periphery thereof. Outlet ports 31 and 33 extend horizontally from opposite side walls of aperture 30 and are directly in line with each other. Outlet port 32 extends vertically upwardly from the side wall of aperture 30, and lies at right angles with respect to both outlet ports 31 and 33. The side wall of aperture 30 opposite the opening to outlet port 32 is unperforated to provide a rotor sealing function that will later be described.

Outlet ports 31, 32 and 33 are suitably tapped at their outside ends for threaded connection with a like plurality of distributing pipes 34, 35 and 36. Distributing pipes 34, 35 and 36 can be provided with suitable couplings as shown in FIG. 1, to which hoses or other distributing lines can be attached.

A hollow rotor 40 is journaled for rotation at its opposite ends in aperture 30 and outlet opening 26a respectively. The outside diameter of cylindrical rotor 40 is preferable the same as the inside diameter of aperture 30 so that a water-sealing relationship between them is established. As shown in FIG. 2, the end of rotor 40 that extends through opening 26a is provided with a gasket sealing member 41 to prevent leakage of water between the rotor and the housing. As previously mentioned, rotor 40 is hollow and is designed to rotate with respect to aperture 30 and outlet opening 26a.

Rotor 40 is provided with an opening 42 in a sidewall thereof, which opening 42 is positioned within aperture 30 to provide fluid communication between hollow rotor 40 and a selected one of the outlet ports 31, 32 or 33. In the preferred embodiment of my invention, opening 42 is a circular opening having the same diameter as outlet ports 31, 32 and 33. Thus, water enters the hollow rotor 40 from outlet opening 26 in body portion 14 and is discharged from the hollow rotor through the opening 42 into a selected one of the outlet ports 31, 32 or 33. The open end of hollow rotor 40 which extends through housing 13 is provided with a plug 43 to prevent the flow of water therethrough.

Also mounted between housings 12 and 13, in parallel with rotor 40, is a threaded lead screw 45. One end of lead screw 45 is journaled for rotation in housing 13, while the other end extends through suitable openings in end plate 15 and body portion 14 so as to be rotatable with respect thereto. Third gear 23 is mounted on the end of lead screw 45 so that lead screw 45 is driven therewith. Thus, when water motor 19 is rotated, lead screw 45 is also rotated by the intermediate gear train.

Mounted on lead screw 45 is threaded cam follower or stop member 46. Stop member 46 is a split-nut assembly having an upper portion 46a and a lower portion 46b, which are hinged together at one end by a hinge member 47. A spring 48 is provided to normally hold the two portions tightly together such that the threaded opening in the stop member 46 engages lead screw 45. When spring 48 is manually compressed, portions 46a and 46b pivot about hinge member 47 to the dotted line position shown in FIG. 6, to permit stop member 46 to be positioned at any point along the length of lead screw 45.

Figure 6:
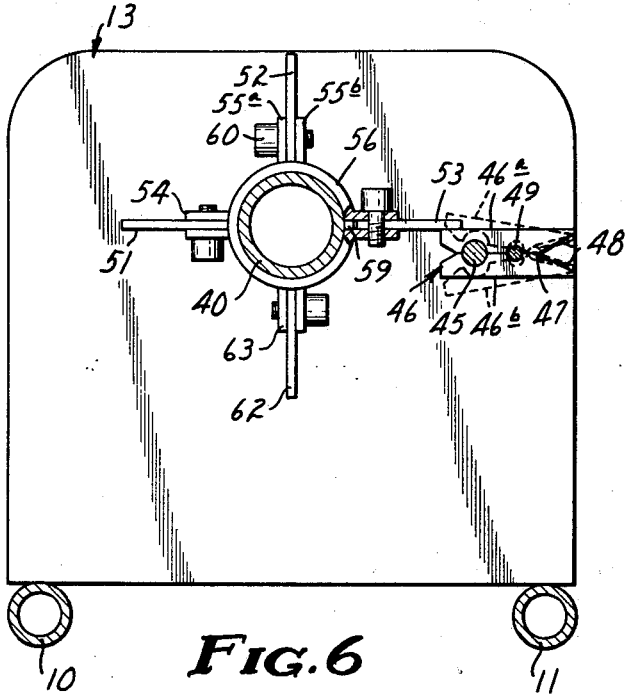
FIGURE 6 is an enlarged sectional view taken along line 6—6 of FIGURE 2.

To prevent rotation of stop member 46 with respect to lead screw 45, a smooth rod 49 is provided which extends between housings 12 and 13 in parallel with lead screw 45. Rod 49 extends through an opening in stop member 46 to prevent its rotation, again as best shown in FIG. 6. Since rod 49 prevents stop member 46 from rotating, the rotation of lead screw 45 causes stop member 46 to travel therealong from a position closer adjacent housing 12 to a position closer adjacent housing 13.

Figure 7:
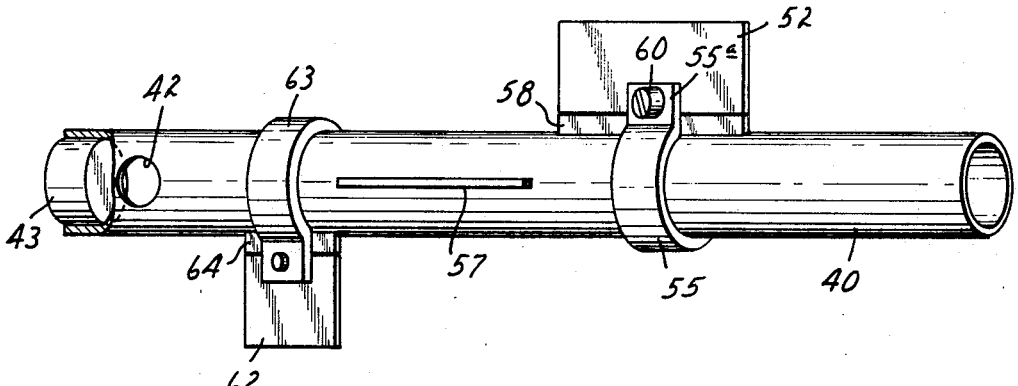
FIGURE 7 is an enlarged perspective view of the rotor and cam members, portions thereof being broken away and shown in section, some parts removed.

A plurality of cam members 51, 52 and 53 are mounted on rotor 40 at intervals along the length thereof. The cam members are mounted to the rotor by means of clamp members 54, 55 and 56. Clamp members 54, 55 and 56 are prevented from rotating with respect to rotor 40 by means of metal key members 57, 58 and 59 welded to the outer surface of rotor 40. Since all of the cam members are mounted to the rotor in the same manner, a more complete description of one will suffice for all. Referring to FIGS. 2 and 7, it can be seen that clamp member 55 has a circular configuration to conform to the outside of rotor 40 and is split on one side so that it can be expanded or contracted with respect to rotor 40.

The opposite ends of the split, circular clamp member 55 terminate generally adjacent the opposite sides of key member 58, and then extend upwardly along the opposite sides of key member 58, and then extend upwardly along the opposite sides of key member 58. These two upwardly turned ends of clamp member 55 are designated by the numerals 55a and 55b. Ends 55a and 55b extend upwardly beyond key member 58 and cam member 52 is positioned between them. The bottom edge of cam member 52 thus rests against the top edge of key member 58. A bolt or screw 60 extends through end 55a, cam member 52 and into end 55b. When screw 60 is tightened, cam member 52 is tightly clamped between ends 55a and 55b, and clamp member 55 is securely tightened on rotor 40. Thus, clamp member 55 cannot move longitudinally with respect to rotor 40 because of the clamping action, and cannot change its angular position because of the clamping action and because of the key member 58.

Cam members 51, 52 and 53 are positioned at intervals along the length of rotor 40, and at different angular positions around the rotor. The angular positions of the cam members correspond to the angular positions of the outlet ports 31, 32 and 33.

Each of the cam members 51, 52 and 55 is operative to engage stop member 46 as stop member 46 moves along lead screw 45. Thus, in FIG. 2, cam member 53 is shown engaged with stop member 46 to hold rotor 40 in the position shown. In the position shown in FIG. 2, rotor opening 42 is aligned with outlet port 31.

A coiled spring 61 is mounted on rotor 50 to bias rotor 40 to rotate in a clockwise direction as viewed from the right end of FIG. 1. One end of spring 61 is attached to rotor 40 while the other end is attached to housing 13.

Again referring to FIG. 2, when lead screw 45 is rotated by means of water motor 19, stop member 46 moves to the left toward housing 13. After a predetermined amount of movement, stop member 46 will clear cam member 53, thus permitting spring 61 to rotate rotor 40 in a clockwise direction to engage cam member 52 with stop member 46. Rotor 40 thus snaps from the first position to the second position with cam member 52 engaging stop member 46, to place rotor opening 42 in line with outlet port 32. As lead screw 45 continues to rotate, stop member 46 continues to move until it passes beyond cam member 52, at which point the rotor again snaps to a third position in which cam member 52 engages stop member 46. In this third position, rotor opening 42 will be in line with outlet port 33.

An additional cam member 62 is secured to rotor 40 adjacent spring 61 by means of an additional clamp member 63. Again, clamp member 63 is prevented from rotating by means of a key member 64. The additional cam member 62 is placed at a different angular position than the other three cam members, this position corresponding to one in which rotor opening 42 will be aligned with the unperforated side wall of aperture 30. Thus, as stop member 46 moves beyond cam member 51, spring 61 snaps rotor 40 ninety degrees in a clockwise direction until the additional cam member 62 engages stop member 46. Once this final ninety degree rotation is accomplished, rotor opening 42 will be sealed to prevent further flow of water through the unit. Once the water flow stops, the water motor 19 no longer rotates so that the lead screw 45 also stops.

Although only three outlet ports are shown on the preferred embodiment of my invention, it is evident that additional outlet ports could be provided at more closely spaced intervals so that a greater number of areas could be sprinkled. If additional outlet ports were provided, it would then be necessary to also provide a corresponding number of additional cam members on the rotor. In every case, the cam members are positioned at whatever angular positions on the rotor are necessary to hold the rotor opening in line with the corresponding outlet ports.

In summary, my invention operates as follows. Before the water is turned on, rotor 40 is manually rotated in a counterclockwise direction until rotor opening 42 is aligned with the first outlet port 31. Then, stop member 46 is manually compressed to spread apart portions 46a and 46b, and then stop member 46 is moved to a position adjacent housing 12. At this point, both rotor 40 and stop member 46 are released so that cam member 53 engages stop member 46 to hold the rotor in the initial position. The water is then turned on. As the water flows through water motor 19, the motor rotates to in turn rotate lead screw 45. The water of course continues to flow through hollow rotor 40, through rotor opening 42 and through outlet port 31 to the desired sprinkler head. When a predetermined volume of water has flowed through the system, as measured by water motor 19, stop member 46 will have traveled along lead screw 45 a distance such that it passes beyond cam member 53. The rotor then immediately snaps to the next position so that the full flow of water is immediately available to outlet port 32. This sequence repeats itself until the rotor snaps to the final position with the last cam member 62 engaging stop member 46. At this point, water flow stops and the system must be manually reset before the cycle can be repeated.

In the preferred embodiment of the present invention, as shown on the drawings, each of the cam members 51, 52 and 53 is of the same length so that equal volumes of water will flow through the outlet ports 31, 32 and 33, during each cycle. This is true since water motor 19 measures volume of water flow, rather than time, so that a predetermined distance of movement of stop member 46 along lead screw 45 always represents the same volume of water flow through the system. Thus, if it is desired to change the volume of water flowing to any part of the system, it is only necessary to replace the cam member involved with a cam member of different length. If, for example, a smaller volume of water through outlet port 31 is desired, cam member 53 can be replaced with a shorter cam. If a shorter cam member is used, stop member 46 need not move as far to pass beyond the cam member, thus representing a smaller volume of water flow through the system. If a shorter cam member is used, the other clamp members must also be loosened and moved so that when one cam member ends, another begins. In other words, if cam member 53 is replaced with a shorter one, clamp member 55 and clamp member 54 must both be moved toward housing 12 a distance corresponding to the length removed from cam member 53. Preferably, the adjacent ends of adjoining cam members will lie in a single plane extending perpendicular to rotor 40. In any event, both the length and the longitudinal positioning of each of the cam members can be changed to vary the amount of water flowing through each of the outlet ports.

The present invention, as shown and described herein, has many advantages over the prior art structures of which I am aware. No electrical connections are required, therefore there is no shock hazard and no need for underwriter approval. The mass flow measurement principal senses water pressure and causes the unit to distribute the water in predetermined amounts, regardless of fluctuations in water pressure between cycles or within one particular cycle. The amount of water distributed by the system, or through any one port, can easily be controlled by the operator.

The unit is simple in construction and is not susceptible to leakage of water at high inlet pressures, since only three water bushings are required. The unit is not susceptible to jamming due to contaminates in the water since no springs, toggles, linkages or cam surfaces are required to operate while inundated in the fluid being distributed. There are relatively few parts in the mechanism, which makes the design inherently more reliable in operation, and lower in cost.

The indexing mechanism is external to the water jacket, so that the operator can effect repair or replacement of components without difficult disassembly of the water jacket. The unit may be made to operate through its entire cycle from minutes per cycle to hours per cycle simply by selecting a different lead screw pitch, or different water motor gear ratios. As far as construction materials are concerned, the water jacket ends may be punch pressed from metal, may be die cast of aluminum or zinc, or may be molded from plastic. The rotor may be constructed from metal or plastic. Further, the cams and cam follower unit may be constructed from metal or plastic. The choice of materials will depend upon desired service life, compatible frictional coefficients and piece part manufacturing costs.

While I have shown and described a preferred embodiment of my invention herein, it is evident that those skilled in the art may depart from the preferred embodiment without departing from the spirit and scope of the invention.

What is claimed is:
1. A distribution device for multiple head lawn sprinkler systems, comprising:
 (a) a frame having first and second spaced housings mounted thereon;
 (b) a water motor mounted in said first housing, said housing having water inlet and outlet openings for said motor, and said motor being operative to be driven at a rate determined by the volume of water flowing therethrough;
 (c) said second housing having a plurality of water distributing pipes mounted therein, said pipes opening at spaced positions into a side wall of an aperture formed in said second housing;
 (d) a hollow rotor journaled for rotation at its opposite ends in said aperture of said second housing and in said outlet opening of said first housing respectively;
 (e) said rotor having an opening in a side wall thereof positioned within said aperture to provide fluid communication between said hollow rotor and a selected one of said distributing pipe openings;
 (f) a lead screw mounted between said first and second housing adjacent said rotor;
 (g) means including said water motor for rotating said lead screw;
 (h) a threaded stop member releasably mounted on said lead screw;
 (i) means to prevent rotation of said stop member, said threaded stop member thereby traveling along said lead screw upon the rotation thereof;
 (j) a plurality of cam members, equal in number to said plurality of distributing pipes, mounted on said rotor at intervals along the length thereof, and at different angular positions around said rotor, each of said cam members being operative to engage said stop member as it moves along said lead screw to thereby hold said opening in said rotor aligned with a corresponding one of said distributing pipe openings; and
 (k) means for automatically rotating said rotor to engage the next cam member with said stop member to thereby align said rotor opening with the next distributing pipe opening when said stop member moves beyond a preceding cam member.

2. The apparatus of claim 1 wherein said side wall of said aperture in said second housing has a nonperforated area between the first and last of said openings to said distributing pipe to stop the flow of water through said opening in said rotor when said rotor opening is aligned with said unperforated area.

3. The apparatus of claim 2 wherein an additional cam member is mounted on said rotor to hold said rotor opening in alignment with said unperforated area upon completion of the sprinkling cycle.

4. The apparatus of claim 1 wherein said threaded stop member is a split nut, spring loaded to a normally closed position, thereby being releasable from said lead screw for repositioning thereon.

5. The apparatus of claim 4 wherein said means to prevent rotation of said stop member includes a rod extending between said first and second housings adjacent said lead screw, said rod extending through an opening in said stop member to prevent rotation thereof.

6. The apparatus of claim 1, wherein said cam members are generally flat, rectangular members each being secured to said rotor by a releasable clamp member that can be moved and locked to said rotor at any position within a predetermined range of positions along a portion of the length of said rotor.

7. The apparatus of claim 6 wherein said cam members are removable from said clamp members and wherein cam members of different lengths are provided so that the volume of water flowing through each distributing pipe can be changed.

8. A fluid distribution device, comprising:
 (a) a frame;
 (b) a hollow rotatable rotor journaled in said frame;
 (c) fluid conduit means including a fluid motor operated by fluid flow therethrough for supplying a flow of fluid to one end of said rotor;
 (d) means for distributing said fluid flowing through said rotor including an opening in said rotor adjacent its other end, and a plurality of fluid distributing means mounted adjacent said other end in position to be successively aligned, one at a time, with said rotor opening when said rotor is rotated to a like plurality of different positions;
 (e) means for rotating said rotor in a predetermined direction to place said rotor in said different positions; and
 (f) means including means operated by said fluid motor for holding said rotor in each said different positions until a predetermined volume of fluid flows through the corresponding fluid distributing means.

9. The apparatus of claim 8 wherein a lead screw is driven by said fluid motor, a threaded stop member is mounted thereon so as to travel along said lead screw upon rotation thereof, and a like plurality of cam members are mounted at different linear and angular positions on said rotor to successively engage said stop member, each of said cam members thereby engaging said stop member to hold said rotor in one of said positions for a period of time determined by the length of said cam member and the speed of travel of said stop member along said lead screw.

10. The apparatus of claim 9 wherein each of said cam members is secured to said rotor by a releasable clamp member than when released is longitudinally movable with respect to said rotor.

11. The apparatus of claim 10 wherein said cam members are removable from said clamp members for replacement thereof with different size cam members.

12. The apparatus of claim 8 wherein means are provided to seal said opening in said rotor upon rotation of said rotor through all of said different positions.

13. The apparatus of claim 9 wherein an additional cam member is mounted on said rotor to engage said stop member after rotation of said rotor through all of said different positions, to hold said rotor in a final position, and wherein means are provided to seal said opening in said rotor in said final position.

References Cited

UNITED STATES PATENTS

| | | | |
|---|---|---|---|
| 1,004,726 | 10/1911 | Barney | 137—625.11 XR |
| 1,211,097 | 1/1917 | Dana | 239—66 |
| 1,739,787 | 12/1929 | Doughty et al. | 239—66 XR |
| 3,108,609 | 10/1963 | Schroder | 137—624.14 |

ROBERT G. NILSON, Primary Examiner

U.S. Cl. X.R.

239—66, 68